United States Patent [19]

Machuron

[11] Patent Number: 4,673,860
[45] Date of Patent: Jun. 16, 1987

[54] SPEED CONTROL CIRCUIT FOR AC MOTOR

[75] Inventor: Robert Machuron, St. Vallier, France

[73] Assignee: Ronic S.A., Nice, France

[21] Appl. No.: 820,072

[22] Filed: Jan. 21, 1986

[30] Foreign Application Priority Data

Jan. 21, 1985 [FR] France ................................ 85 00805

[51] Int. Cl.[4] .............................................. H02P 5/40
[52] U.S. Cl. ..................................... 318/812; 318/809; 318/345 CB
[58] Field of Search ........ 318/345 D, 345 CB, 345 H, 318/345 L, 345 G, 809, 812

[56] References Cited

U.S. PATENT DOCUMENTS

| | | | |
|---|---|---|---|
| 3,443,189 | 5/1969 | Gilbreth | 318/345 C |
| 3,678,360 | 7/1972 | Minrik et al. | 318/345 D |
| 3,697,863 | 10/1972 | Kilner | 318/812 |
| 3,742,337 | 6/1973 | Digneffe | 318/345 D |
| 4,271,386 | 6/1981 | Lee | 318/812 |
| 4,392,093 | 7/1983 | Paule et al. | 318/345 D |

Primary Examiner—David Smith, Jr.
Attorney, Agent, or Firm—Laubscher & Laubscher

[57] ABSTRACT

The invention discloses a speed variator for an AC motor included preferably in a food processing apparatus. The variator comprises a controllable switching member, such as a triac, and an RC circuit for regulating the motor speed to a predetermined speed. A current compensating circuit is provided, connected across the terminals of capacitors in the regulating circuit and to a terminal of the variator for compensating a current increase to maintain the predetermined motor speed regardless of the fluctuations of the load torque on the motor during motor operation.

12 Claims, 2 Drawing Figures

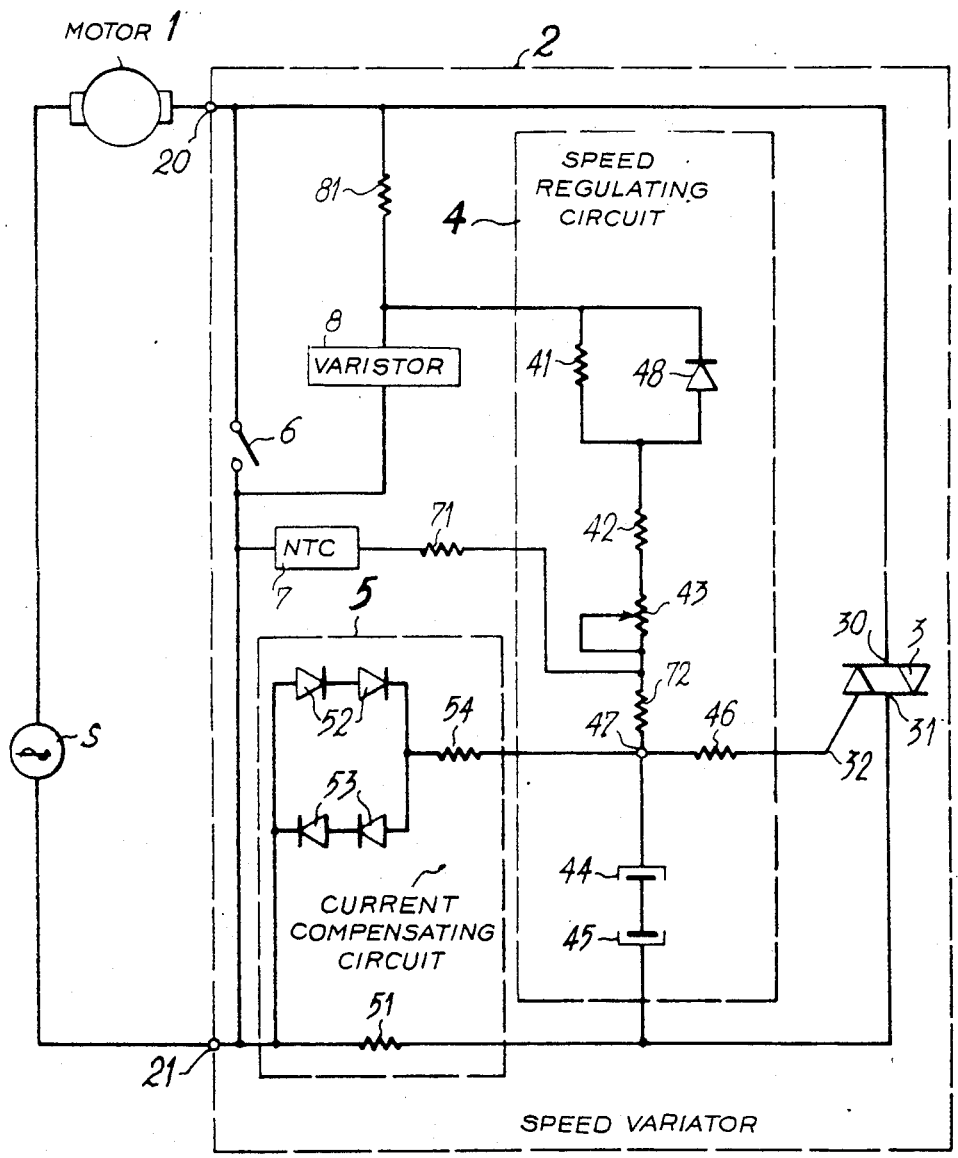

4,673,860

SPEED CONTROL CIRCUIT FOR AC MOTOR

BACKGROUND OF THE INVENTION

1. Field of the Invention

This invention relates to a speed variator for controlling speed in an AC or universal motor supplied from an AC supply source to regulate the motor speed at a predetermined speed.

2. Description of the Prior Art

More especially, such a speed variator comprises a controllable switching member having a control electrode, and a circuit for regulating the motor speed at a predetermined speed. The regulation circuit includes an adjustable resistor and a capacitor, both connected in series across two terminals of the switching member and having a common terminal connected to the control electrode. Generally, the switching element is a triac, which is equivalent to two antiparallel-connected thyristors, the two triac terminals constituting speed variator terminals.

A main disadvantage of such a speed control circuit is that the motor speed decreases when load torque on the motor increases. This decrease in the speed thus disturbs the use of the constant speed motor preadjusted to the predetermined speed.

OBJECT OF THE INVENTION

The main object of this invention is to avoid the above disadvantage, to keep the motor at a relatively constant predetermined speed regardless of the fluctuations of the load torque as the motor operates.

SUMMARY OF THE INVENTION

Accordingly, a speed variator is provided for controlling the speed in an AC motor, the variator being connected in series with the motor between terminals of an AC voltage supply device, the speed variator comprising:

a controllable switching device having a control electrode, means for regulating the motor speed at a predetermined speed, the regulating including an adjustable resistance means and a capacitance device connected in series between terminals of the switching device, the resistance and capacitance devices having a common terminal connected to said control electrode, and means connected to the terminals of the capacitance device and a terminal of the speed variator for compensating a current increase when a load torque on the motor increases, to maintain the motor speed at said predetermined speed.

In accordance with the present invention, an increased current due to an increased load torque is compensated by increasing the AC supply voltage of the motor, which is done by advancing the gating of the switching means at each half-wave of the AC voltage. In a preferred embodiment, the compensating device comprises at least two oppositely-poled diodes connected in series with a first resistor between the variator terminal and the common terminal, and a second resistor between the variator terminal and a capacitance device terminal connected to a terminal of the switching means.

In accordance with another feature of the invention, the speed variator comprises means for turning off the switching means when the switching means temperature reaches a predetermined operational limit, to avoid overheating the motor under a high, lasting load torque. Preferably, these turning-off means include in particular a negative temperature coefficient resistor which can be connected in parallel with the capacitance to shunt the capacitance when the temperature reaches the predetermined operating limit.

BRIEF DESCRIPTION OF THE DRAWING

Further advantages and features of this invention will be apparent from the following detailed description of several embodiments of this invention with reference to the corresponding accompanying drawings in which:

FIG. 2 shows in detail a speed variator according to a second embodiment.

DESCRIPTION OF THE PREFERRED EMBODIMENTS

Figure 1:
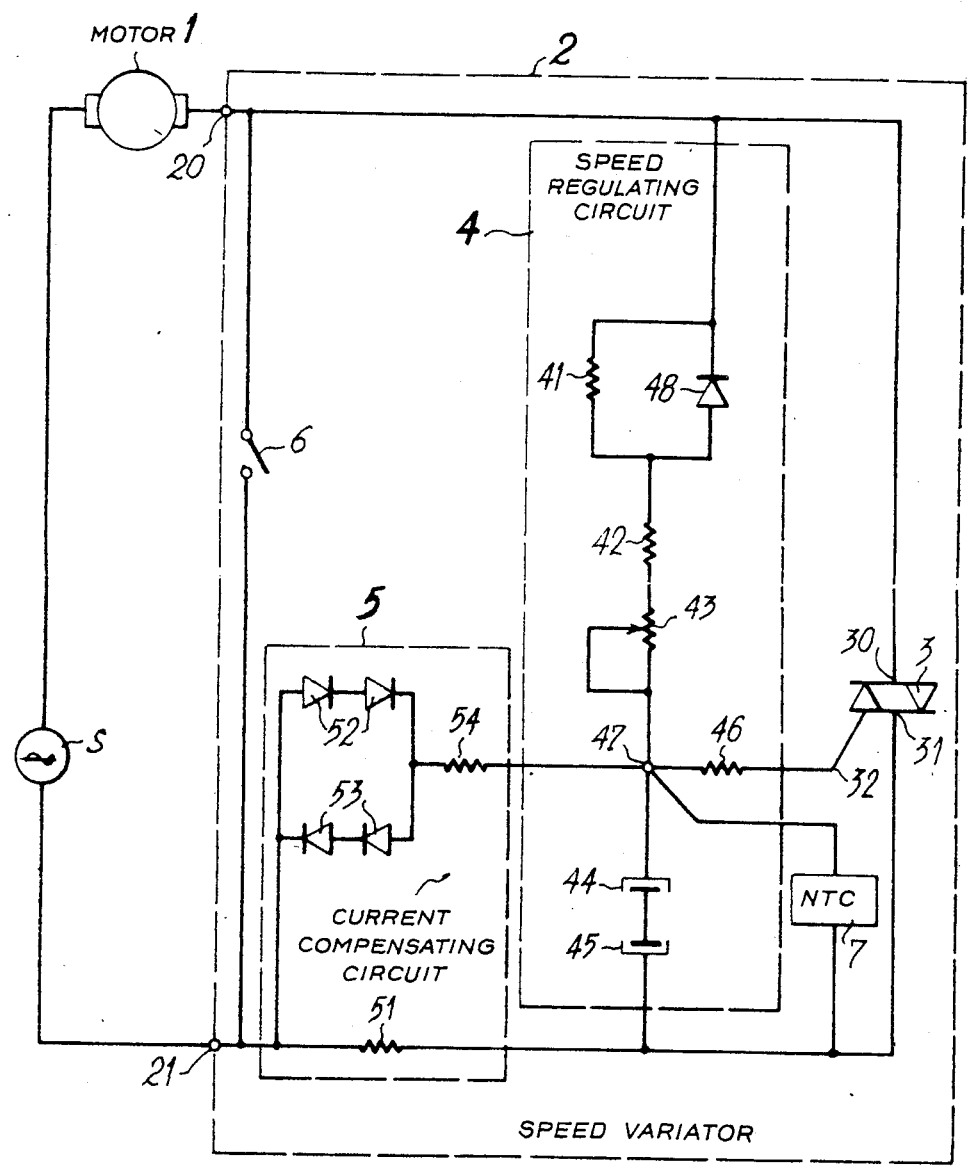
FIG. 1 shows in detail a speed variator for a universal or AC motor according to a first embodiment.

In the embodiments described hereafter, a universal or AC electric motor 1, to which is coupled a speed variator embodying this invention, is preferably a small relatively low-power single-phase motor driving a food processing apparatus for treating edible materials. In such an apparatus, the motor rotates a shaft carrying one or more tools such as knives, beaters, whisks, or the like, rotated in a container to mince, hash, beat or simply mix raw or cooked edible materials in the container. Both when the motor starts and as it treats the edible materials, it must overcome a load torque which depends on the variable density of the edible materials.

As shown in FIG. 1, a speed variator 2, included in the above-mentioned apparatus, comprises a controllable switching member including one triac 3, a speed regulating circuit 4 and one current compensating circuit 5.

Two terminals 30 and 31 of the triac 3 are respectively connected, directly and through resistor 51 of circuit 5 to two terminals 20 and 21 of the speed variator 2. As shown in FIG. 1, speed variator 2 is connected in series with the electric motor 1 to terminals of an Ac power supplys which is a 220 Volts–50 Hz or 220 Volts–60 Hz mains. One speed control terminal 20 is connected to motor terminal 1 and the other terminal 21 is connected to one side of the line supply S.

The speed regulating circuit 4, by controlling the gate or control electrode 32 of triac 3, provides a way of chopping the mains AC voltage into a voltage having a stablized rms value when the motor operates no load, i.e. without any resisting torque, or with a constant load torque. Circuit 4 includes, in series between identical leads 20 and 30 and terminal 31, a resistor 41, a second resistor 42, a potentiometer 43 and two polarized electrolylic capacitors 44 and 45, connected in series and having terminals opposing each other. Capacitors 44 and 45 can be replaced by a single nonpolarized but more costly capacitor. Circuit 4 also includes a third resistance 46 interconnected between the gate 32 and a terminal 47 common to the potentiometer 43 and to the capacitor 44.

Circuit 4 is thus an RC phase shift circuit controlling the triac at each half-wave of the AC supply voltage. The series-connected members 41 to 45 determine a conduction current in triac 3 so that the rms power supply voltage of the motor 1, and thus the speed of the motor 1, are constant. Resistor 42 can be replaced by a potentiometer controlled by a user of the food processing apparatus, to adjust the speed of motor 1 continuously and gradually as a function of edibles being processed. The potentiometer 43 is factory-adjusted to set the minimum speed of the motor 1 under no-load condition. Preferably, a diode 48 is connected in parallel with the first resistor 47 and is forwardly poled in the direction from terminal 47 to terminal 20. Diode 48 balances the rms voltage between successive half-waves. Resistor 46 stabilizes and limits the current in the triac gate 32.

The current compensating circuit 5 includes, in addition to the resistor 51 already mentioned, two oppositely-poled pairs of diodes 52 and 53 connected in series with a second resistor 54 between terminals 21 and 47. Diodes 52 and 53 help advance the triac gating, through resistor 54, for each of the two current half-waves. Correlatively, resistor 51 advances the discharge of capacitor 44 or 45 at each respective half-wave. The resistor 51 has a low resistance and can, preferably, comprise a resistive wire or a conductive path on a printed circuit.

Considering that the resisting torque at each instant in time is proportional to the current intensity, as soon as the load torque on motor 1 increases and the motor speed decreases, the resulting rise in the current is automatically compensated by the circuit 5, which increases the voltage beforehand by charging or discharging capacitor 44 or 45 by anticipation at each half-wave. The voltage increase keeps the motor from stalling and maintains the speed at a constant speed, preset in circuit 4 by means of one of the potentiometers 42 and 43. Such a compensation may, for example, be due to the gradual thickening of a cream or food paste in the abovementioned processing apparatus container.

The speed variator 2 also includes a manually controlled contact 6 connected between variator terminals 20 and 21. When contact 6 is closed, the rest of the speed variator is shunted, and the motor 1 is supplied directly from mains, to allow the motor to operate at maximum speed.

Preferably, a negative temperature coefficient (NTC) resistor 7 is included in the speed variator 2 to act as a safety device when the motor 1 overheats due to too high a load torque, and thus too high a current, for a certain time interval. According to the embodiment illustrated in FIG. 1, the NTC resistor 7 is connected in parallel with capacitors 44 and 45 between terminals 47 and 31. In this embodiment, the compensating circuit 5 increases the motor supply voltage and accelerates the motor contrary to the desired objective which is to maintain a constant speed. The resistance of the NTC resistor 7 quickly decreases by the overheating due to the increased current, thus shunting capacitors 44 and 45 and thus turning off triac 3 by means of gate control electrode 32, to stop the overheated motor, i.e. when the temperature of the triac 3 reaches a predetermined operating limit. The fluctuations of the load torque and thus of the current are thereby limited. According to another organization of the first embodiment shown in FIG. 1, the NTC resistor 7 is connected in series with an adjustable resistor such as a potentiometer, to adjust the predetermined limit of operation.

According to a second embodiment shown in FIG. 2, substantially similar to the one described in reference to FIG. 1, an NTC resistor 7 has a first terminal connected to terminal 21 of the speed variator 2 and a second terminal connected to terminal 47, preferable through a voltage divider having two resistors 21 and 22. Resistor 21 preferably adjustable, is connected between the second terminal of the NTC resistor 7 and a terminal common to potentiometer 43 and to resistor 72. Another terminal of resistor 72 is connected to terminal 47, common to resistors 44 and 46, and capacitor 44, the resistors 42, 43 and 72 being connected in series. In this embodiment, the NTC resistor 7 affects the reaction of the triac 3 in the compensating circuit 5 and helps achieve a more accurate thermal regulation. The resistor 71 adjusts the sensitivity threshold of the NTC resistor 7.

As shown in FIG. 2, the speed variator 2 also includes a variator 2 and a resistor 81. Variator 8 has a first terminal connected to terminal 21 of the speed variator 2 and a second terminal connected to a terminal common to resistors 41 and 81 and connected to a cathode of diode 48. Another terminal of resistor 81 is connected to the identical terminals 20 and 30. The varistor 8 stabilizes the supply voltage of motor 1 when the AC mains voltage S varies practically by approximately ±10%.

What I claim is:

1. Apparatus connected in series with an AC motor and an AC voltage supply for variably controlling the speed of the motor, comprising
   (a) a controllable switching device having a control electrode;
   (b) means connected with said switching device for regulating the motor speed at a predetermined value, said speed regulating means including adjustable resistance means and capacitance means connected in series with said switching device, said adjustable resistance means and said capacitance means having a common terminal connected with said control electrode; and
   (c) current compensation means connected between said capacitance means and the AC voltage supply for compensating a current increase when the load torque on the motor increases, said compensation means including at least two oppositely-poled diodes connected in series with a first resistor between said common terminal and the supply and a second resistor connected between the supply and the junction between said switching device and said capacitance means, whereby the motor speed is maintained at the predetermined value.

2. Apparatus as defined in claim 1, wherein said second resistor has a small resistance and comprises one of a resistive wire and a printed circuit conductor.

3. Apparatus as defined in claim 1, and further comprising means for deactivating said switching device when said switching device reaches a predetermined operating temperature limit.

4. Apparatus as defined in claim 1, and further comprising a negative temperature coefficient resistor connected in parallel with said capacitance means.

5. Apparatus as defined in claim 1, and further comprising a negative temperature coefficient resistor connected in series with said adjustable resistance means between the terminals of said capacitance means.

6. Apparatus as defined in claim 1, and further comprising a negtive temperature coefficient resistor connected between said common terminal and the junction between said switching device and said capacitance means.

7. Apparatus as defined in claim 6, wherein said negative temperature coefficient resistor is connected with said common terminal through an adjustable voltage divider.

8. Apparatus as defined in claim 1, and further comprising a variator connected at one end with the supply and at the other end through a third resistor to a junction between the motor and said switching device.

9. Apparatus as defined in claim 1, wherein said adjustable resistance means includes two potentiometers connected in series.

10. Apparatus as defined in claim 1, wherein said adjustable resistance means is connected in series with a parallel connected resistor and diode.

11. Apparatus as defined in claim 1, and further comprising a resistor connected between said common terminal and said control electrode.

12. Apparatus as defined in claim 1, wherein said capacitance means comprises a pair of electrolytic capacitors connected in series and having terminals in opposition with each other.

* * * * *